(12) United States Patent
Fan

(10) Patent No.: US 12,117,121 B2
(45) Date of Patent: Oct. 15, 2024

(54) ELECTRONIC DEVICE STAND SYSTEM

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 154 days.

(21) Appl. No.: 17/891,051

(22) Filed: Aug. 18, 2022

(65) Prior Publication Data

US 2023/0332732 A1 Oct. 19, 2023

(30) Foreign Application Priority Data

Apr. 18, 2022 (CN) .......................... 202220890403.8

(51) Int. Cl.
| | |
|---|---|
| *F16M 11/10* | (2006.01) |
| *A47B 23/04* | (2006.01) |
| *F16M 13/02* | (2006.01) |

(52) U.S. Cl.
CPC ............ *F16M 11/10* (2013.01); *F16M 13/02* (2013.01); *A47B 23/043* (2013.01); *A47B 23/044* (2013.01); *F16M 2200/08* (2013.01)

(58) Field of Classification Search
CPC ...... F16M 11/10; A47B 23/043; A47B 23/044
USPC ....... 248/459, 460, 454, 455, 457, 458, 461, 248/465
See application file for complete search history.

(56) References Cited

U.S. PATENT DOCUMENTS

| | | | |
|---|---|---|---|
| 4,460,146 A * | 7/1984 | Raggiotti ............... | A47G 1/142 248/456 |
| 7,861,995 B2 * | 1/2011 | Liou .................. | F16M 11/2021 248/459 |
| 8,100,376 B2 * | 1/2012 | Ye .......................... | F16M 13/00 248/455 |
| 2013/0277271 A1 * | 10/2013 | Toulotte ................. | A45C 11/00 206/752 |
| 2017/0223161 A1 * | 8/2017 | Lau ........................ | F16M 11/10 |
| 2022/0273096 A1 * | 9/2022 | He ....................... | F16M 13/005 |
| 2022/0337279 A1 * | 10/2022 | Lin ....................... | A45C 11/00 |
| 2023/0020938 A1 * | 1/2023 | Liu ...................... | A47B 23/043 |

* cited by examiner

Primary Examiner — Alfred J Wujciak
(74) Attorney, Agent, or Firm — John D. Tran; Rhema Law Group, P.C.

(57) ABSTRACT

An electronic device stand system and methods of manufacturing can include: a bottom plate; a support plate coupled to the bottom plate with a bottom plate to support plate bendable connection; and an angle adjustment member coupled to the bottom plate and the support plate, the angle adjustment member providing the electronic device stand system with an unfolded configuration, a support configuration, and a storage configuration, and wherein: the angle adjustment member is folded to contact the support plate and extended between the support plate and the bottom plate to maintain an angle between the bottom plate and the support plate when in the support configuration, the angle adjustment member is flat when in the unfolded configuration, and the bottom plate to support plate bendable connection is folded with the bottom plate and the support plate in direct contact when in the storage configuration.

9 Claims, 8 Drawing Sheets

ELECTRONIC DEVICE STAND SYSTEM

TECHNICAL FIELD

This disclosure relates to mobile device optimization, more particularly to mobile device stands.

BACKGROUND

Electronic products, such as, notebook computers, and mobile phones, for example, are all commonly used nowadays. With powerful functions and convenience, people often use these products at the same time.

For example, users might use a mobile phone for listening to music while simultaneously operating a notebook computer. Further, a user might additionally use the mobile phone to follow incoming calls or social networking site messages. The user might additionally use the laptop and the mobile phone to conduct video conferences and live events, with multiple groups at the same time.

A problem quickly arises, in that users cannot hold all of these devices. It is also problematic and difficult for users to hold the devices while also typing. The same holds true when attempting to use other input devices such as mouses, mouse pads, joy sticks, and other peripheral devices.

The electronic accessory market further demands rich functionality and low costs from competitive products. Electronics stands that only have a single operation mode will severely limit usage, functionality, and market value.

Solutions have been long sought but prior developments have not taught or suggested any complete solutions, and solutions to these problems have long eluded those skilled in the art. Thus, there remains a considerable need for devices and methods that can facilitate the simultaneous use of the mobile phone and the notebook computer.

SUMMARY

An electronic device stand system and methods, providing improved organization and fixation of electronic devices, are disclosed. The electronic device stand system can include: An electronic device stand system and methods of manufacturing can include: a bottom plate; a support plate coupled to the bottom plate with a bottom plate to support plate bendable connection; and an angle adjustment member coupled to the bottom plate and the support plate, the angle adjustment member providing the electronic device stand system with an unfolded configuration, a support configuration, and a storage configuration, and wherein: the angle adjustment member is folded to contact the support plate and extended between the support plate and the bottom plate to maintain an angle between the bottom plate and the support plate when in the support configuration, the angle adjustment member is flat when in the unfolded configuration, and the bottom plate to support plate bendable connection is folded with the bottom plate and the support plate in direct contact when in the storage configuration.

A primary objective of the present electronic device stand system is to provide a convenient stand for mobile phones able to extend or be stowed away from the back of a notebook computer screen. The electronic device stand system can furthermore use the magnetic suction to adhere to the mobile phone thus providing a dual-screen interactive operation mode, which makes it convenient to simultaneously use the notebook computer and the mobile phone. Furthermore, the electronic device stand system can provide different manners to fix the mobile phone.

To achieve the above-mentioned objective, the electronic device stand system can include: a bottom plate, a support plate, and an angle adjustment member; the support plate being connected to the bottom plate and bendable at the connection, a magnetic attachment area being disposed on the support plate at a location far away from the connection with the bottom plate, and an adhesive area being disposed on an underside of bottom plate at the connection between the bottom plate and the support plate; the angle adjustment member comprising a first piece and a second piece, connected to each other, and bendable at the connection, the two ends of the angle adjustment member being respectively connected to the bottom plate and the support plate and bendable at the connection, the bottom plate also having an extension area, adjacent to the connection between the support plate and the bottom plate, and the extension area being disposed with one of the metal and the magnetic material; the support plate being disposed with the other of the metal and the magnetic material at a corresponding position; the second piece of the angle adjustment member being attached to the support plate, the first piece supporting the support plate to be fixed on the bottom plate at an acute angle; and when in a support configuration, the support plate being attached to the extension area, a mobile phone able to be attached to the magnetic attachment area in both support and unfolded configurations for fixation.

In one contemplated embodiment, the support plate is embedded with a ferromagnetic material in the magnetic attachment area. In another contemplated embodiment, the adhesive area is an adhesive surface that can be repeatedly adhered to.

In yet another contemplated embodiment, the bottom plate is disposed with one of the metal and the magnetic material, and the support plate is disposed with the other of the metal and the magnetic material; when the first piece is disposed with one of the metal and the magnetic material, the second piece is disposed with the other of metal and magnetic material.

In still yet another contemplated embodiment, the electronic device stand system can include a storage configuration; in the storage configuration, the bottom plate and the support plate are attached flatly together, and the first piece and the second piece are attached flatly together. In still yet another contemplated embodiment, the bottom plate has a first concave area in the middle, and the adjacent support plate has a second concave area, and the angle adjustment member is connected to the bottom plate through the first piece and connected to the support plate through the second piece, the first piece is located in the first concave area, and the second piece is located in the second concave area in the storage configuration.

In still yet another contemplated embodiment, the position where the first piece is connected to the bottom plate and the position where the second piece is connected to the support plate are far away from the connection between the support plate and the bottom plate. Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The electronic device stand system is illustrated in the figures of the accompanying drawings which are meant to be exemplary and not limiting, in which like reference numerals are intended to refer to like components, and in which.

DETAILED DESCRIPTION

Figure 1:
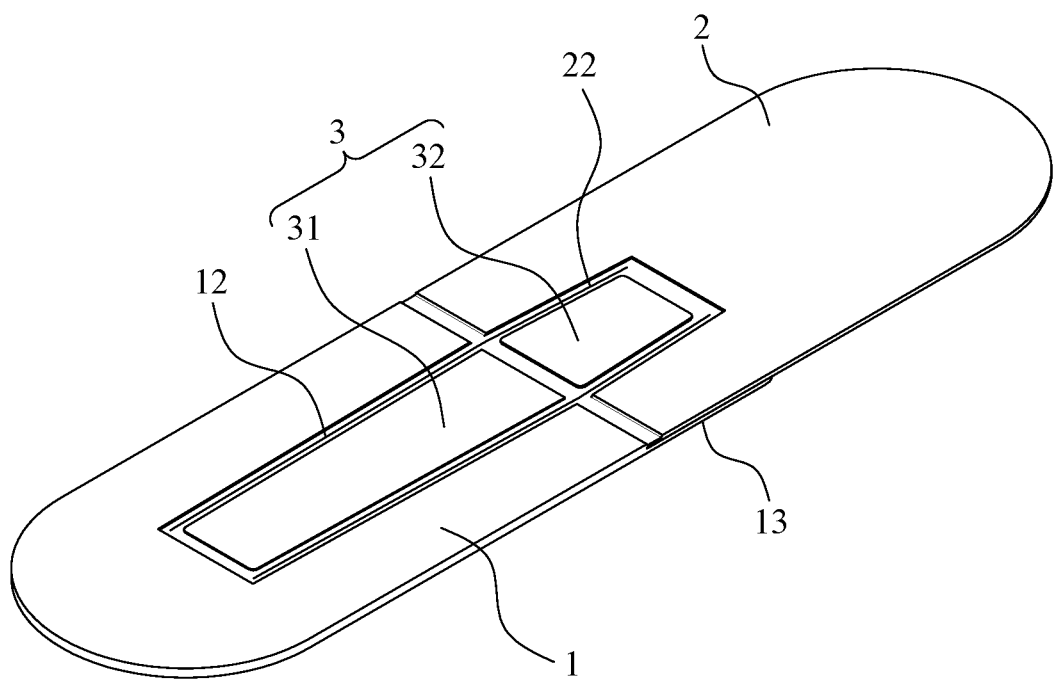
FIG. 1 is a back side perspective view of the electronic device stand system in an unfolded configuration.

In the following description, reference is made to the accompanying drawings that form a part hereof, and in which are shown by way of illustration, embodiments in which the electronic device stand system may be practiced. It is to be understood that other embodiments may be utilized and structural changes may be made without departing from the scope of the electronic device stand system.

When features, aspects, or embodiments of the electronic device stand system are described in terms of steps of a process, an operation, a control flow, or a flow chart, it is to be understood that the steps can be combined, performed in a different order, deleted, or include additional steps without departing from the electronic device stand system as described herein.

The electronic device stand system is described in sufficient detail to enable those skilled in the art to make and use the electronic device stand system and provide numerous specific details to give a thorough understanding of the electronic device stand system; however, it will be apparent that the electronic device stand system may be practiced without these specific details.

In order to avoid obscuring the electronic device stand system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGS.

Generally, the electronic device stand system can be operated in any orientation. As used herein, the term "couple" as in "coupled" or "coupling" mean a physical connection whether direct or indirect.

Figure 2:
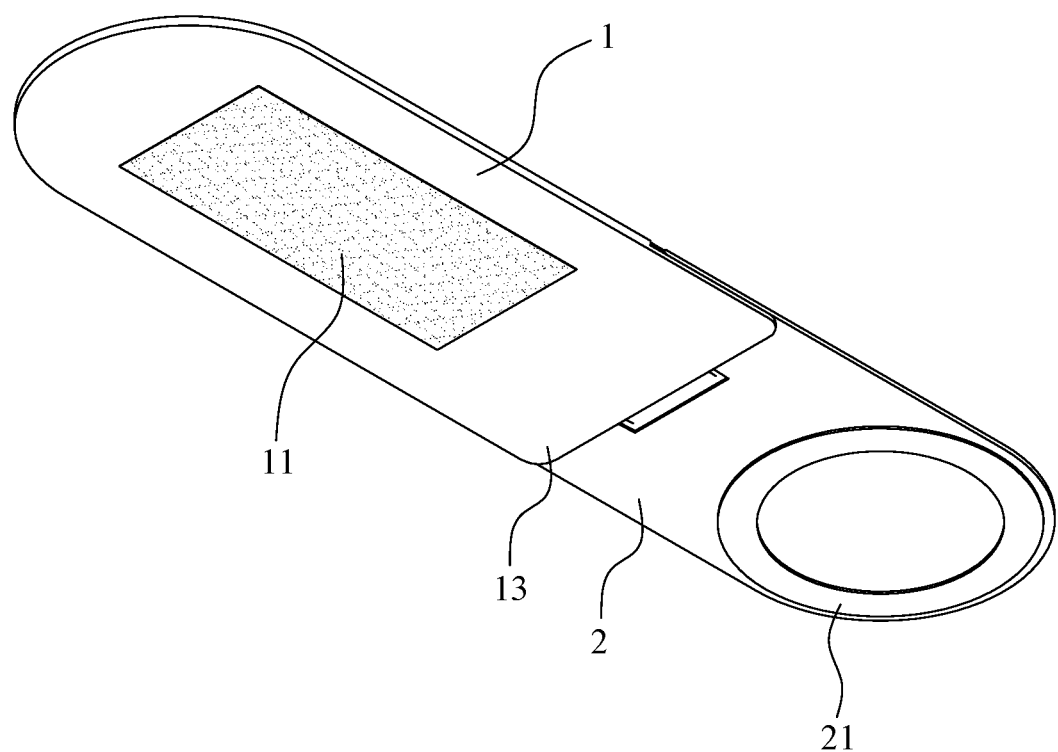
FIG. 2 is a front side perspective view of the electronic device stand system of FIG. 1.

Referring now to FIG. 1 and FIG. 2, the electronic device stand system can include a bottom plate 1, a support plate 2 and an angle adjustment member 3.

The angle adjustment member 3 can provide the electronic device stand system with an unfolded configuration, a support configuration, and a storage configuration, and wherein: the angle adjustment member 3 is folded to contact the support plate 2 and extended between the support plate 2 and the bottom plate to maintain an angle between the bottom plate 1 and the support plate 2 based on the electronic device stand system being in the support configuration, the angle adjustment member 3 is flat based on the electronic device stand system being in the unfolded configuration, and the bottom plate to support plate bendable connection is folded with the bottom plate 1 and the support plate 2 in direct contact based on the electronic device stand system being in the storage configuration.

The support plate 2 is connected to the bottom plate 1 and bendable at the connection place. The support plate 2 is disposed with a magnetic attachment area 21 away from the connection with the bottom plate 1, and a ferromagnetic material is embedded in the magnetic attachment area 21. An adhesive area 11 is disposed on the other side of the connection between the bottom plate 1 and support plate 2, and the adhesive area 11 is a glue surface that can be pasted repeatedly, such as a silicone glue surface.

The angle adjustment member 3 includes a first piece 31 and a second piece 32 which are connected together and bendable at the connection. Both ends of the angle adjustment member 3 are respectively connected to the bottom plate 1 and the support plate 2, and bendable at the connection so that the electronic device stand system can be used in various forms to provide users with different needs.

The bottom plate 1, the support plate 2 and the angle adjustment member 3 are all made of materials with good hardness, such as metal materials or plastic materials. The outer surfaces of the components can be covered with soft rubber, leather, or nylon fabrics, which can also form the various bendable connections between the components of the electronic device stand system.

As shown, the bottom plate 1 can be coupled to the support plate 2 with a bottom plate to support plate bendable connection. The bottom plate to support plate bendable connection can couple the bottom plate 1 to the support plate 2 at either side of the first concave area 12 and the second concave area 22.

The angle adjustment member 3 can be positioned within the first concave area 12 and second concave area 22 when in the unfolded configuration. The bottom plate 1 can be coupled to the first piece 31 with a bottom plate to first piece bendable connection.

The support plate 2 can be coupled to the second piece 32 with a support plate to second piece bendable connection. The first piece 31 can be coupled to the second piece 32 with a first piece to second piece bendable connection.

When in the unfolded configuration, also depicted as an extended configuration, the support plate 2 is shown in direct contact with and is shown to lay upon the extension area 13 extending from the bottom plate 1. In the unfolded configuration, the second piece 32 is also in direct contact with the extension area 13; however, the support plate to second piece bendable connection is not in contact with the extension area 13, as is depicted in FIG. 2.

Figure 3:
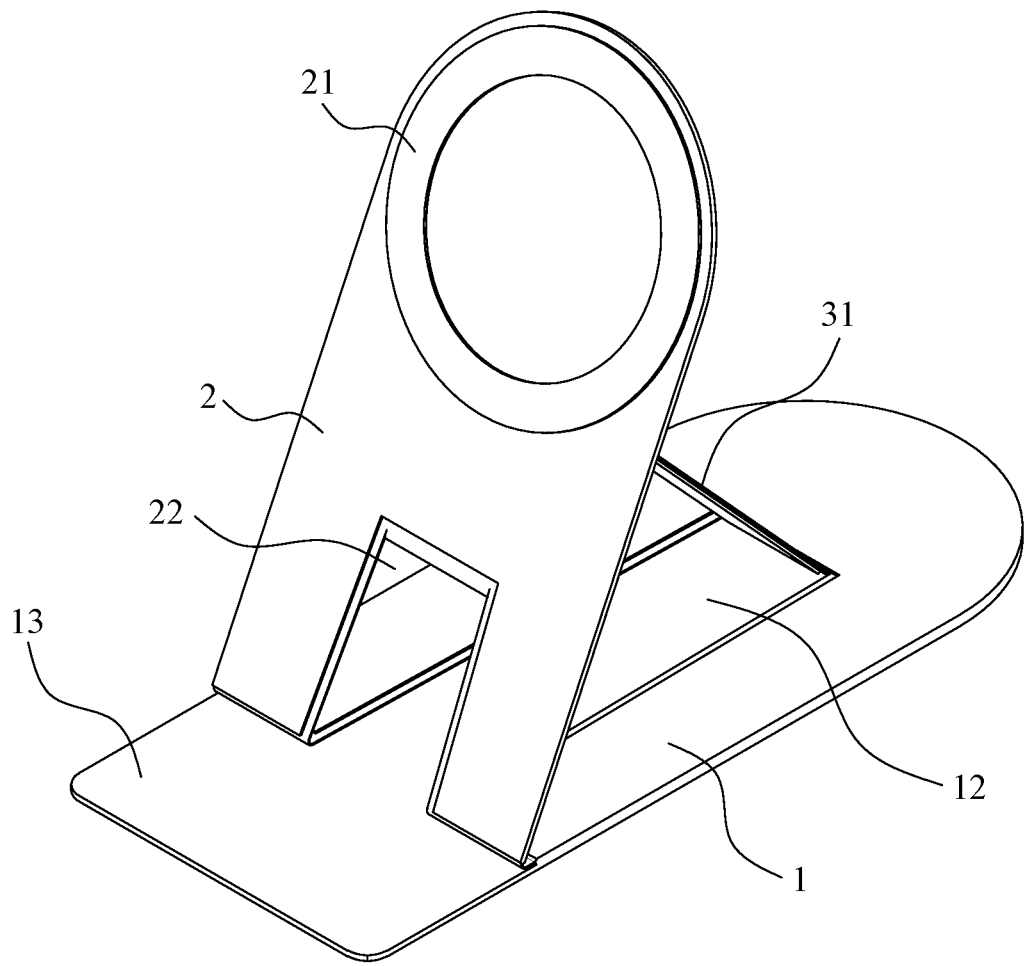
FIG. 3 is a perspective view of the electronic device stand system of FIG. 1 in a support configuration.
Figure 4:
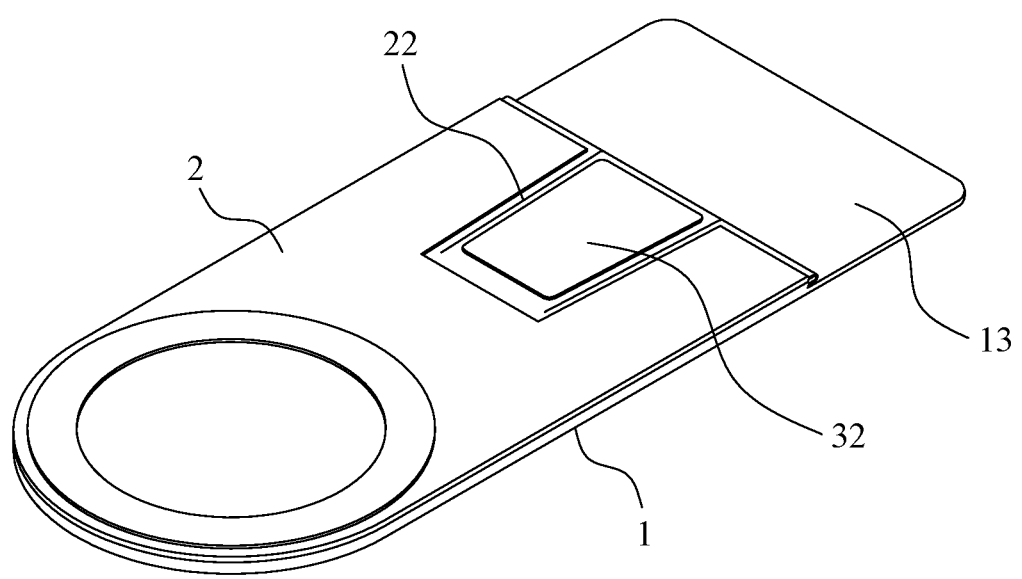
FIG. 4 is a perspective view of the electronic device stand system of FIG. 1 in a storage configuration.

Referring now to FIG. 3 and FIG. 4, the bottom plate 1 has a first concave area 12 in the middle position, and the support plate 2 has a second concave area 22 adjacent to the first concave area 12. The angle adjustment member 3 has the first piece 31 connected to the bottom plate 1 and is bendable at the connection.

The second concave area 22 is depicted as an open area without material of the support plate 2 while the first concave area 12 is depicted as an area having a smaller cross-sectional area that the rest of the bottom plate 1. However it is contemplated that the first concave area 12 and the second concave area 22 could be areas of the bottom plate 1 and the support plate 2 that have a smaller cross-sectional width that other areas of the bottom plate 1 or the support plate 2 or could be open areas.

In the storage configuration, the first piece 31 is located in the first concave area 12. The angle adjustment member 3 has the second piece 32 connected to the support plate 2, and is bendable at the connection.

In the storage configuration, the second piece 32 is located in the second concave area 22. The position where the first piece 31 is connected to the bottom plate 1 and the position where the second piece 32 is connected to the support plate 2 are far away from the connection between the support plate 2 and the bottom plate 1.

Figure 5:
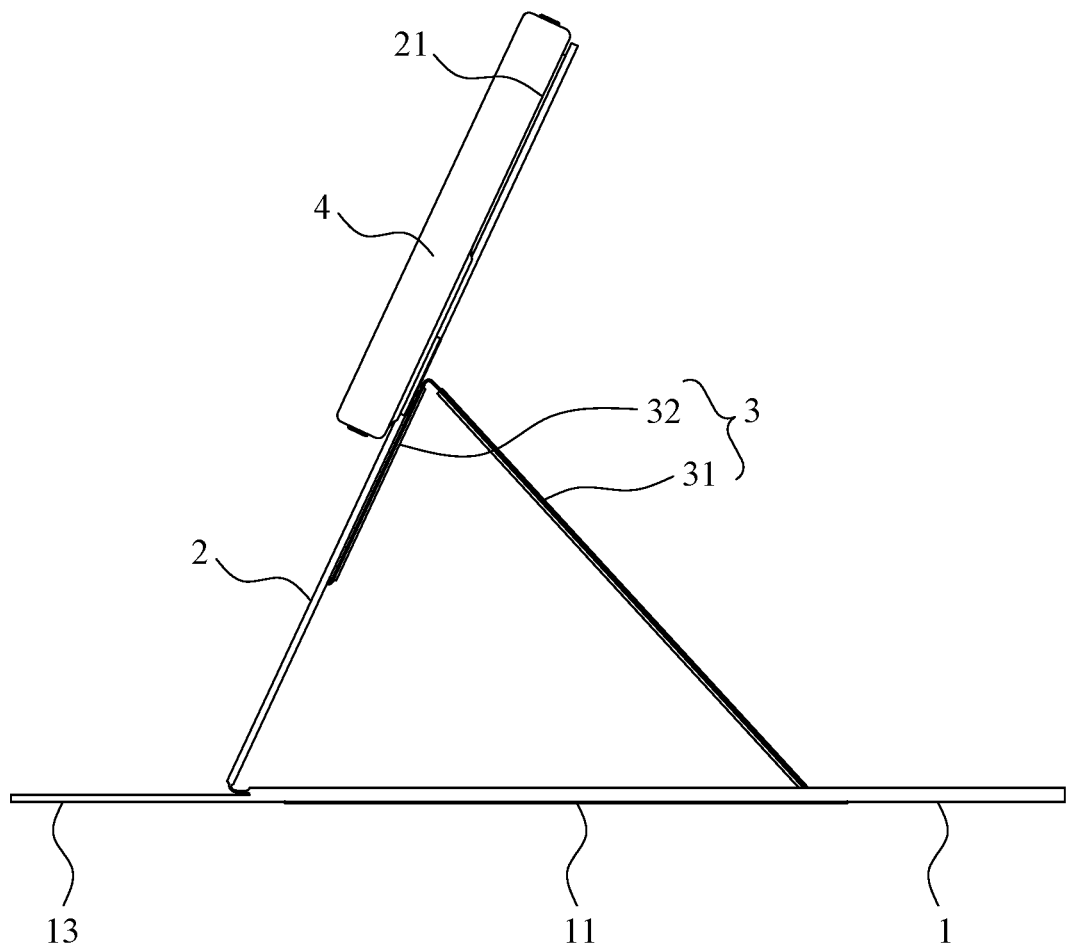
FIG. 5 is a side view of the electronic device stand system of FIG. 3 with a mobile phone.

As shown in FIG. 3 and FIG. 5, in the support configuration, the second piece 32 of the angle adjustment member 3 is attached to the support plate 2, and the first piece 31 supports the support plate 2 to be fixed at an acute angle. In the support configuration, the second piece 32 and the first piece to second piece bendable connection is in direct contact with the support plate 2. On the bottom plate 1, the mobile phone 4 with metal on the back is placed in the magnetic attachment area 21 to be adsorbed and fixed.

Some mobile phones 4 have magnetism on the back, and they can be placed directly on the magnetic attachment area 21. In the present embodiment, the magnetic attachment area 21 is in the shape of a raised ring, but it is not limited to thereto.

As shown in FIG. 4, in the storage configuration, the bottom plate 1 and the support plate 2 can be attached to each other, and the first piece 31 and the second piece 32 of the angle adjustment member 3 are also attached, so that the overall volume can be further reduced.

Moreover, the support plate 2 is not connected to the edge of the bottom plate 1, the bottom plate 1 also has an extension area 13, and the extension area 13 is adjacent to the connection between the support plate 2 and the bottom plate 1. The extension area 13 is disposed with one of metal and magnetic material, and the support plate 2 is disposed with the other of metal and magnetic material at the corresponding position.

In the present embodiment, the extension area 13 is a metal plate, and the support plate 2 is a magnetic plate body; for example, a magnet sheet is embedded, so that when the support plate 2 is attached to the extension region 13, the two can be adsorbed and fixed by the magnetic force to maintain the elongated shape of the unfolded configuration. In addition, the area with strong magnetic force of the magnetic attraction region 21 faces the direction of the extension area 13. The support plate 2 contacts the extension area 13 when the electronic device stand system is in the unfolded configuration.

Figure 6:
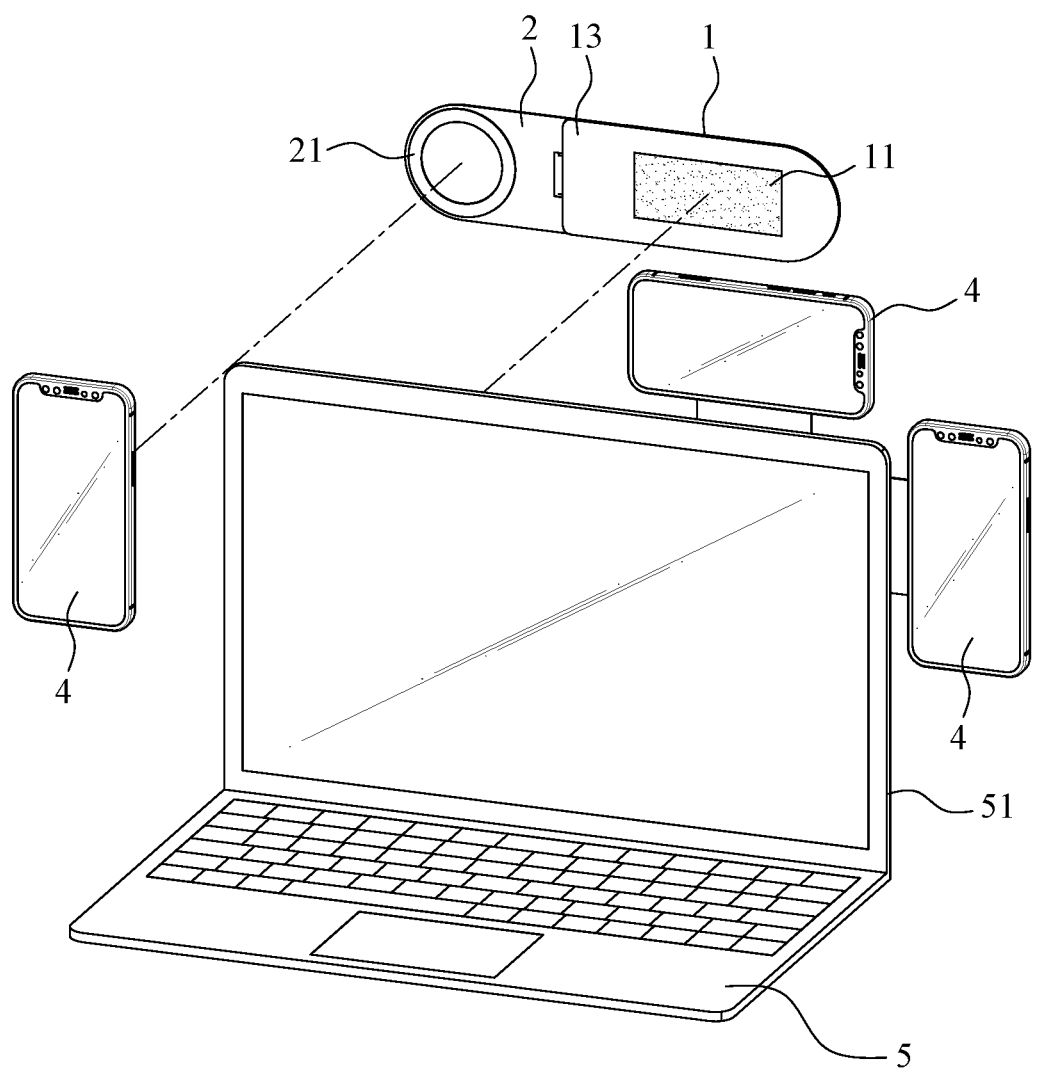
FIG. 6 is an exploded perspective view of the electronic device stand system for use with a plurality of electronic devices.

As shown in FIG. 6, which is an exploded perspective view of the electronic device stand system for use with a plurality of electronic devices. The electronic device stand system is pasted on the back of a screen 51 of a notebook computer 5 by the adhesive area 11, the support plate 2 is adsorbed to the extension area 13, and the mobile phone 4 with a metal on the back is attached to the support plate 2 by the magnetic attachment area 21.

FIG. 6 shows a plurality of electronic device stand systems in a variety of usage scenarios. Users can place the mobile 4 at the right side, left side next to the screen 51, or above the screen 51.

Figure 7:
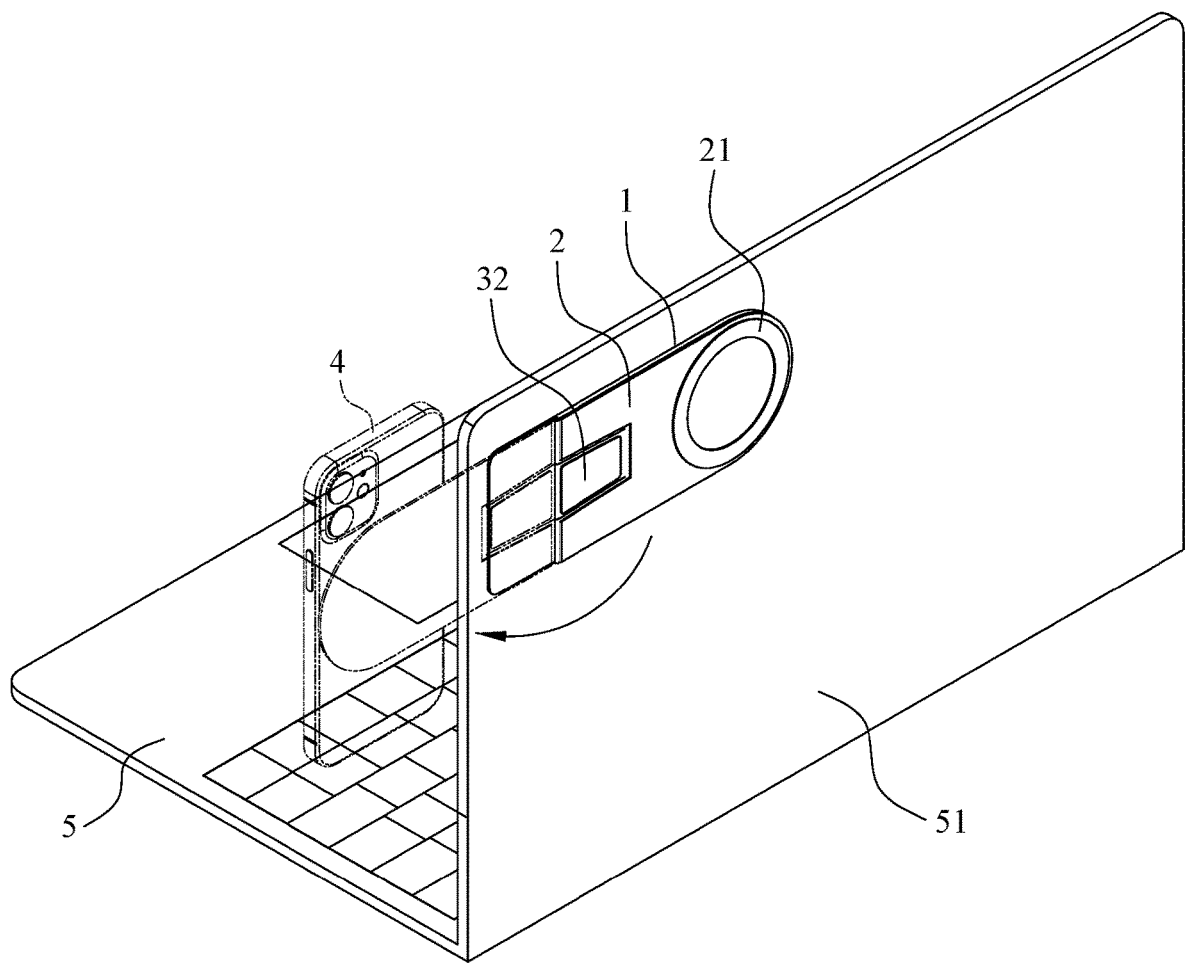
FIG. 7 is a perspective view of the electronic device stand system in two configurations.

In addition, as shown in FIG. 7, when the mobile phone is removed, the support plate 2 can also be attached to the bottom plate 1 and hidden on the back of the screen 51, which is not only aesthetic, but also facilitate packaging the notebook computer 5 in the backpack when closed.

Moreover, in the preferred embodiment of the present electronic device stand system, the first piece 31 and the second piece 32 of the bottom plate 1, the support plate 2 and the angle adjustment member 3 can be partially or entirely designed with magnetism, such as arranging magnets, or installing magnetic materials in the components, to facilitate mutual adsorption during storage, or for other usages. For example, the bottom plate 1 is one of magnetic material and metal, and the support plate 2 is the other of the magnetic material and metal. In the present embodiment, the support plate 2 and the second piece 32 are both magnetic, and the bottom plate 1 and the first piece 31 are metal.

As such, in the support configuration, the second piece 32 and the support plate 2 can be attracted to each other, so as to maintain the included angle between the supporting plate 2 and the bottom plate 1. In the storage configuration, the support plate 2 can be adsorbed on the bottom plate 1, which is beneficial to the reduction of the volume and the convenience of storage. In the unfolded configuration, the support plate 2 is adsorbed on the extension area 13, which is beneficial for the mobile phone 4 to be fixed on the magnetic attachment area 21.

More particularly concerning the various configurations, the first piece 31 can be within the first concave area 12, the second piece 32 is within the second concave area 22, and the first piece to second piece bendable connection is straight based on the electronic device stand system being in the unfolded configuration. Furthermore, the first piece 31 is within the first concave area 12, the second piece 32 is within the second concave area 22, and the first piece to second piece bendable connection is folded based on the electronic device stand system being in the storage configuration. Yet still further the first piece 31 is outside of the first concave area 12, the second piece 32 is outside of the second concave area 22, and the first piece to second piece bendable connection is folded based on the electronic device stand system being in the support configuration.

Furthermore, the present electronic device stand system can also be a simple stand, that is, the bottom plate 1 does not have the setting of the adhesive area, and the structure includes a bottom plate 1, a support plate 2, and an angle adjustment member 3. The support member plate 2 connected to the bottom plate 1 and can be bent at the joint, the support plate 2 is disposed with a magnetic attachment area 21 away from the joint with the bottom plate 1, and the angle adjustment member 3 includes a first piece 31 and a second piece connected to each other and bendable at the connection, and the two ends of the angle adjustment member are respectively connected to the bottom plate 1 and the support plate 2, and bendable at the connection.

The second pieces 32 is attached to the support plate 2, and the first piece 31 supports the support plate 2 and is fixed on the bottom plate 1 at an acute angle. In the storage configuration, the bottom plate 1, the support plate 2 and the angle adjustment member 3 are attached flatly together.

Although the present electronic device stand system has been described with reference to the preferred embodiments thereof, it is apparent to those skilled in the art that a variety of modifications and changes may be made without departing from the scope of the present electronic device stand system which is intended to be defined by the appended claims.

Figure 8:
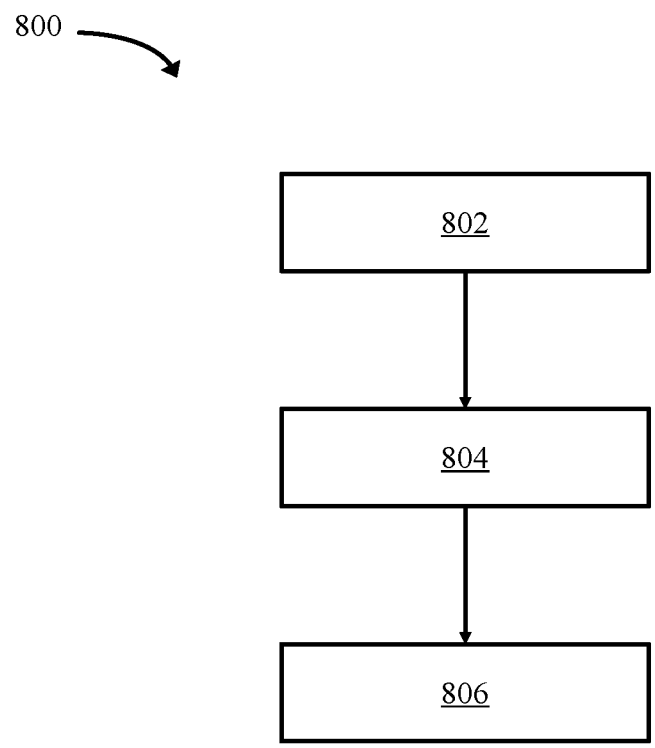
FIG. 8 is a control flow for the manufacturing of the electronic device stand system.

Referring now to FIG. 8, therein is shown a control flow 800 for the manufacturing of the electronic device stand system. The control flow 800 can include: providing a bottom plate 1 having a first concave area 12 in a block 802; coupling a support plate 2, having a second concave area 22, to the bottom plate 1 with a bottom plate to support plate bendable connection in a block 804; and coupling an angle adjustment member 3 having a first piece 31 to the bottom plate 1 and having a second piece 32 to the support plate 2, the angle adjustment member 3 further including a first piece to second piece bendable connection coupling the first piece 31 and the second piece 32, the angle adjustment member 3 providing the electronic device stand system with an unfolded configuration, a support configuration, and a storage configuration, and wherein: the angle adjustment member 3 is folded to contact the support plate 2 and extended between the support plate 2 and the bottom plate to maintain an angle between the bottom plate 1 and the support plate 2 based on the electronic device stand system being in the support configuration, the angle adjustment member 3 is flat based on the electronic device stand system being in the unfolded configuration, and the bottom plate to support plate bendable connection is folded with the bottom plate 1 and the support plate 2 in direct contact based on the electronic device stand system being in the storage configuration in a block 806.

Thus, it has been discovered that the electronic device stand system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the electronic device stand system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. An electronic device stand system comprising:
   a bottom plate with an extension area;
   a support plate coupled to the bottom plate with a bottom plate to support plate bendable connection; and
   an angle adjustment member coupled to the bottom plate and the support plate, the angle adjustment member providing the electronic device stand system with an extended configuration, a support configuration, and a storage configuration, and wherein:
      the angle adjustment member is folded to contact the support plate and extended between the support plate and the bottom plate to maintain an angle between the bottom plate and the support plate based on the electronic device stand system being in the support configuration,
      the angle adjustment member is flat and the support plate lays upon the extension area based on the electronic device stand system being in the extended configuration, and
      the bottom plate to support plate bendable connection is folded with the bottom plate and the support plate in direct contact based on an electric device being in the storage configuration.

2. The system of claim 1 further comprising: a first angle member bendable connection coupling the angle adjustment member to the bottom plate and a second angle member bendable connection coupling the angle adjustment member to the support plate.

3. The system of claim 1 further comprising: a magnetic attachment area on the support plate for magnetically supporting an electronic device.

4. The system of claim 1 further comprising: an adhesive on the bottom plate for adhering the bottom plate to an electronic device.

5. An electronic device stand system comprising:
   a bottom plate having an extension area and a first concave area;
   a support plate having a second concave area, the support plate coupled to the bottom plate with a bottom plate to support plate bendable connection; and
   an angle adjustment member having a first piece coupled to the bottom plate and a second piece coupled to the support plate, the angle adjustment member further including a first piece to second piece bendable connection coupling the first piece and the second piece, the angle adjustment member providing the electronic device stand system with an extended configuration, a support configuration, and a storage configuration, and wherein:
      the angle adjustment member is folded to contact the support plate and extended between the support plate and the bottom plate to maintain an angle between the bottom plate and the support plate based on the electronic device stand system being in the support configuration,
      the angle adjustment member is flat and the support plate lays upon the extension area based on the electronic device stand system being in the extended configuration, and
      the bottom plate to support plate bendable connection is folded with the bottom plate and the support plate in direct contact based on an electric device being in the storage configuration.

6. The system of claim 5 wherein: the first piece is within the first concave area, the second piece is within the second concave area, and the first piece to second piece bendable connection is straight based on the electronic device stand system being in the extended configuration.

7. The system of claim 5 wherein: the first piece is within the first concave area, the second piece is within the second concave area, and the first piece to second piece bendable connection is folded based on the electronic device stand system being in the storage configuration.

8. The system of claim 5 wherein: the first piece is outside of the first concave area, the second piece is outside of the second concave area, and the first piece to second piece bendable connection is folded based on the electronic device stand system being in the support configuration.

9. The system of claim 5 wherein: the bottom plate to support plate bendable connection is rubber, leather, or nylon.

* * * * *